Jan. 22, 1963  H. W. NEUMANN  3,074,813
METHOD FOR THE COATING OF SHEETS AND
STRIPS WITH THERMOPLASTIC
SYNTHETIC HIGH POLYMERS
Filed Dec. 9, 1958
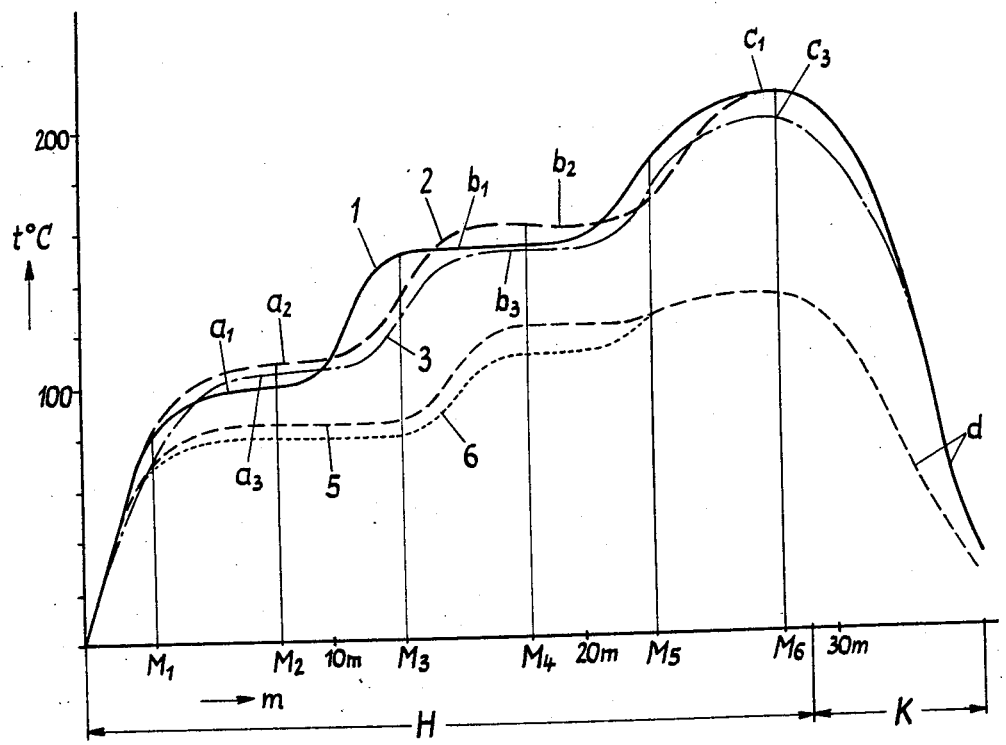
INVENTOR.
HANS WERNER NEUMANN
BY MICHAEL S. STRIKER
ATTORNEY.

3,074,813
Patented Jan. 22, 1963

3,074,813
METHOD FOR THE COATING OF SHEETS AND STRIPS WITH THERMOPLASTIC SYNTHETIC HIGH POLYMERS
Hans Werner Neumann, Neuwied, Germany, assignor to Stahl- und Walzwerke Rasselstein/Andernach A.G., Neuwied (Rhine), Germany, a firm
Filed Dec. 9, 1958, Ser. No. 779,127
Claims priority, application Germany Dec. 13, 1957
8 Claims. (Cl. 117—132)

This invention comprises a method for the coating of metal sheets and strips with thermoplastic high polymers, especially polyethylene, in which a dispersion consisting of finely divided high polymers and an organic solvent is applied to the metal sheets and strips and solvent is then evaporated by heating.

The known dispersions prepared from low boiling organic solvents, water or aqueous mixtures have the disadvantage that in thinner layers (under 20 g./m.$^2$ on one side of the metal) they do not provide non-porous coatings. This is due to the fact that after the application and heating the dispersing agent will evaporate first, the polyethylene particles settle on the sheet surface (forming of sediment) and then melt together, thereby forming a film.

For the application of the above known methods it is furthermore necessary to use very finely divided synthetic powders, thus necessitating a special and expensive preparation, such as a milling of the polyethylene resulting from the synthesis. Besides, the surface of coatings prepared according to this known coating method will often be uneven in appearance.

It has further been known to prepare coatings from high polymers, especially polyethylene, in that synthetic powder is dissolved in the heat and this hot solution is then applied to the sheets or strips. This application is, however, connected with difficulties and has the added disadvantage that in single coating only a small thickness of layer can be achieved.

The above mentioned deficiencies of the known coating methods are eliminated according to this invention, in that finely divided high polymers having a grain size of about 100μ or less are dispersed in organic solvents which are not or only partly mixable with water, whereby the boiling point of at least the major part of the solvents must be above the softening point of the synthetic product. The high polymers are then, after the application of the dispersion to the metal sheets or strips, dissolved by prolonged heating at a temperature above the softening point, and the solvents are then evaporated by short heating at a higher temperature.

In the application of this new coating method, a hot solution of the plastic which will spread evenly and non-porously also in thin layers is thus produced first, and only then the solvent is evaporated. For such dispersions grain sizes of about 20–100μ in the powder, depending on the desired thickness of layer, are sufficient, thus dispensing with a pre-preparation, respectively milling, of the high polymers, such as the finely divided low-pressure polyethylene resulting from the process.

This new coating method has the advantage that in thin layers (down to about 3 g./qm.) non-porous coatings are achieved, and that also thicker coatings up to 300–400 g./qm. can be produced in a single coating or one working step respectively. A further advantage consists in that the present method shows on the one hand a wide range of variations as to the high polymers to be used, and on the other hand does not require a special pre-preparation, such as wet pulverizing, of the plastics prior to application. Standing of the dispersions will bring about initial swelling in the plastics. This initial swelling is, however, not necessary, but the plastics may be used in the state as manufactured. A further advantage of the method according to this invention is to be seen in that pigments as well as dyes can be added to the dispersion, so that stucco-like effects can be achieved without the use of embossing equipment.

All synthetic high polymers dissolving above their boiling points in organic solvents and over a prolonged period and being stable at the temperatures used therein, so that they can be dissolved without decomposition, can be used for the process of the present invention. Examples of such high polymers are: polyethylenes, such as high-pressure polyethylenes, low-pressure polyethylenes, also all polymeric compounds able to serve as varnish resins, such as polyvinyl compounds, especially polyvinyl chloride, polyvinyl acetate, polyvinyl ether, also co-polymers from vinyl compounds with other polymerizable compounds, such as vinylidene compounds, acrylic compounds or styrene compounds, also polyamides and polyacrylic compounds which must be meltable and soluble in organic solvents when melted.

To produce the dispersion, the high polymer powder or polyethylene powder respectively are processed into a viscous dispersion, suspension or paste in a solvent mixture. For this, organic solvents or solvent-mixtures being not or practically not mixable with water are used, whose boiling points lie preferably, i.e. of the major part of these solvents, above the softening points of the polyethylene to be processed.

The solvent or solvent-mixture should not, thereby, dissolve the finely divided plastics at low temperatures, but at most swell them slightly to a limited degree.

This slight swelling may be beneficial for the production and stabilization of the dispersions. The composition of the solvents or solvent-mixtures must, therefore, be adapted to the plastics to be used, as well as the consistency of the dispersions and pastes on which again depends the achievable thickness of layer of the coatings on the metal sheets and strips and the content of solids in the finished coatings.

In many cases, solvent-mixtures are used which should not dissolve the plastics at room-temperature; but they must dissolve the plastics above the melting point of the plastics. Within said mixtures, one component may dissolve the plastics, while the other component or components may not.

From these facts can be seen that the solvent-mixtures may be different according to circumstances and may practically consist of a solvent and a non-solvent for the plastics used in the special case. The question as to which solvents can be used in the several cases will be answered from commercial points of view first, and is further influenced by the desired thickness of the coating.

Following examples of solvents that may be used: Tetra- and dekahydro naphthalene, benzene, xylene, toluene and other aromatics, also light and heavy gasoline, such as the gasoline trademarks "Esso-Varsol" (boiling range 155 to 185°) and "Esso-Solvent" (boiling range 130 to 150°) distributed by the Esso Company, also ketones, such as cyclohexanone.

As afore-mentioned, the metal sheets or strips are progressively heated after the application of the dispersion or paste to achieve solution and binding to the metal. This heating may take place in special heating devices, but is preferably accomplished in continuous-heating or tunnel furnaces where the temperature rises stepwise in the direction of the pass, as illustrated in detail by way of the examples and the attached diagram.

In the diagram, the temperature is measured in ° C. on the ordinate and the distances of the individual measuring points $M_1$, $M_2$, $M_3$, $M_4$, $M_5$ and $M_6$ are measured from the entrance and given as abscissa. H is the entire heating section and K the cooling section. The curves 1, 2, 3, 5 and 6 are in relation to the Examples 1, 2, 3, 5 and 6.

(a) POLYETHYLENE COATINGS

Example 1

6 parts by weight of pulverized polyethylene (Lupolen H delivered by the firm of Badische Anilin- und Soda Fabrik)
5 parts of an organic solvent-mixture, consisting of
    2 parts of tetrahydronaphthalene
    2 parts of dekahydronaphthalene
    1 part of benzene are stirred into a paste and stored for 24 hours at room-temperature for initial swelling. At the end of this period, the paste may be diluted with the given solvent-mixture to the desired viscosity (about 30 seconds, Ford cup, 4 mm. nozzle, 20° C.). If this dispersion is applied to sheet or strip with the help of a known printing roller at varying rates, the thickness of layer obtained will range from about 50 to 150$\mu$ of dry film (thickness). The coated strip or sheet is then brought into the continuous-heating furnace and heated according to the following temperature diagram:

| Measuring points | $M_1$ | $M_2$ | $M_3$ | $M_4$ | $M_5$ | $M_6$ |
|---|---|---|---|---|---|---|
| Temperature, °C | 80 | 100 | 150 | 155 | 185 | 210 |

The distance from the furnace entrance to the first measuring point is 3 m., the distance between the individual measuring points is 5 m., each. The cooling zone, beginning 1 m. behind the last measuring point, has a length of 7 m. The working rate is 1.7 m. a minute, at a layer of 150$\mu$, 2.1 m. a minute, at a layer of 100$\mu$, and 2.5 m. a minute, at a layer of 50$\mu$. The sheet or strip covered with the dispersion is first quickly brought to a temperature close to the softening point (if polyethylene 70–120°) and heated at this temperature for a longer period, as illustrated with curve section $a_1$. This causes a beginning and partial dissolution of the polyethylene. The strip or sheet is then, as illustrated with $b_1$, brought to a temperature lying above the softening point of the polymer (in the example shown about 160°) and also at this temperature heated for a longer period. At this stage of heating, the polymer is dissolved completely in the solvent-mixture, so that this hot solution will spread very evenly over the entire strip or sheet surface. Finally the solvent is evaporated by another short jump of temperature, as indicated in $c_1$, whereafter a cooling (curve $d$) is conducted. At an assumed thickness of layer of the finished polyethylene coating of about 25–35 g./qm., the pass through the furnace takes about 15 minutes. The coated sheet is unobjectionable. Variations in thickness of layer ±5% of desired thickness.

Example 2

6 parts by weight of polyethylene (linear polyethylene by the Farbwerke Hoechst A.G.)
5 parts of organic solvent-mixture consisting of
    2 parts of tetrahydronaphthalene
    2 parts of gasoline 155/185° (Esso Varsol)
    1 part of gasoline 130/150° (Esso Solvent)

are stirred into a paste and stored for 48 hours at room-temperature for initial swelling. At the end of this period, the paste may be diluted wtih the given solvent-mixture to the desired viscosity (about 30 seconds, Ford cup, 4 mm. nozzle, 20° C.). If this dispersion is applied to sheet or strip with the help of a known printing roller at varying rates, the thickness of layer obtained will range from about 30 to 120$\mu$ of dry film (thickness). The coated strip or sheet is then brought into the continuous-heating furnace mentioned in the Example 1 and heated according to the following diagram:

| Measuring points | $M_1$ | $M_2$ | $M_3$ | $M_4$ | $M_5$ | $M_6$ |
|---|---|---|---|---|---|---|
| Temperature, °C | 85 | 110 | 130 | 160 | 170 | 210 |
| Working rate | at a 30 g./qm. layer 2.5 m./min. | | | | | |
| | at a 70 g./qm. layer 2.1 m./min. | | | | | |
| | at a 120 g./qm. layer 1.7 m./min. | | | | | |

Precision of layer as in Example 1.

Example 3

6 parts by weight of polyethylene (pulverized Lupolen H by the firm of Badische Anilin- und Soda Fabrik)
5 parts of an organic solvent-mixture consisting of
    3 parts of gasoline 155/185° (Esso Varsol)
    2 parts of gasoline 130/150° (Esso Solvent)

are stirred into a paste and stored for 24 hours at room-temperature for initial swelling. At the end of this period the paste may be diluted with the given solvent-mixture to the desired viscosity (about 30 seconds, Ford cup, 4 mm. nozzle, 20° C.). If this dispersion is applied to sheet or strip with the help of a known printing roller at varying rates, the thickness of layer obtained will range from about 100 to 200/$\mu$ of dry film (thickness). The coated strip or sheet is then brought into the continuous-heating furnace mentioned in the Example 1 and heated according to the following diagram:

| Measuring points | $M_1$ | $M_2$ | $M_3$ | $M_4$ | $M_5$ | $M_6$ |
|---|---|---|---|---|---|---|
| Temperature, °C | 70 | 105 | 125 | 150 | 175 | 200 |
| Working rate | at a 100 g./qm. layer 2.1 m./min. | | | | | |
| | at a 150 g./qm. layer 1.7 m./min. | | | | | |
| | at a 200 g./qm. layer 1.4 m./min. | | | | | |

Example 4

6 parts by weight of polyethylene (product of the firm of Chemische Werke Hüls)
5 parts of an organic solvent-mixture consisting of
    4 parts of gasoline 130/150° (Esso Solvent)
    1 part of cyclohexanone are stirred into a paste and stored for 48 hours at room-temperature for initial swelling. At the end of this period, the paste may be diluted with the above solvent-mixture to the desired viscosity.

The dispersion is burned-in according to curve 1.

(b) PVC-CO-POLYMER COATINGS

Example 5

5 parts by weight of polyvinylchloride by Farbwerke Hoechst
5 parts of an organic solvent-mixture consisting of gasoline 155/185° (Esso Varsol) and butyl-glycol 9:1 are stirred into a paste together with the amount of plasticizer required for the adjustment of the film (e.g. 15% di-octyl-phthalate, based on dry substance). The paste is diluted with the given solvent-mixture to the desired viscosity, whereby no essential settling of particles is noticeable. This dispersion is applied in the normal manner and burned-in according to the following temperature diagram:

| Measuring points | $M_1$ | $M_2$ | $M_3$ | $M_4$ | $M_5$ | $M_6$ |
|---|---|---|---|---|---|---|
| Temperature, °C | 70 | 85 | 85 | 120 | 125 | 130 |

Furnace dimensions and rates as in Example 1.

Example 6

5 parts by weight of polyvinyl chloride (product of Farbwerke Hoechst)

5 parts by weight of a solvent-mixture consisting of gasoline 130/150° (Esso Solvent) and cyclohexanone 20:1 are stirred into a paste and treated as in Example 1.

Temperature diagram:

| Measuring points | $M_1$ | $M_2$ | $M_3$ | $M_4$ | $M_5$ | $M_6$ |
|---|---|---|---|---|---|---|
| Temperature, ° C | 70 | 80 | 80 | 110 | 125 | 130 |

Example 7

6 parts by weight of a co-polymer of vinyl chloride and vinyl isobutyl ether 6 parts by weight of an organic solvent-mixture consisting of gasoline 130/150° (Esso Solvent) and tetrahydronaphthalene 1:1 are stirred together with an amount of a plasticizer required for proper forming of a film, in order to form a paste. The paste is then diluted by said solvent-mixture up to the required viscosity and then processed as described in the preceding examples. The diagram of temperature of the furnace is adjusted in accordance with the desired thickness of the coating and has a form being similar to that described above.

Example 8

6 parts by weight of a co-polymer of vinyl chloride and vinyl isobutyl ether 6 parts by weight of an organic solvent-mixture consisting of gasoline 155/185° (Esso Varsol) and tetrahydronaphthalene 1:1 are stirred into a paste and diluted and processed as described in the preceding examples.

Example 9

6 parts by weight of a co-polymer of vinyl chloride and vinyl isobutyl ether 5 parts by weight of an organic solvent-mixture consisting of gasoline 155/185° (Esso Varsol) and cyclohexanone 9:1 are stirred into a paste and diluted and processed as described above.

Example 10

6 parts by weight of a co-polymer of vinyl chloride and vinyl isobutyl ether 6 parts by weight of an organic solvent-mixture consisting of gasoline 155/185° (Esso Varsol) and tetrahydrofurane 9:1 are stirred into a paste and diluted and processed as described above.

Instead of the solvent mentioned in the second position of said mixtures, other solvents can be used by varying only the ratio of the components of the mixture.

As plasticizer may be used (not in polyethylene coatings):

Butyl stearate,
 Butyl benzyl phthalate,
 Dibutyl phthalate,
 Dimethyl phthalate,
 Dinonyl phthalate, whereby the number of plasticizers is not at all exhausted. Further, esters of glycerine and the like can be used. Besides the plasticizers, the so-called extenders as used in the industry of plastics may be applied.

Example 11

6 parts by weight of polystyrene having a $k$-value of about 50

6 parts by weight of an organic solvent-mixture consisting of gasoline 130/150° (Esso Solvent) and toluol 1:1 are stirred into a paste and diluted and processed as described above.

Example 12

6 parts by weight of polystyrene having a $k$-value of about 50

6 parts by weight of an organic solvent-mixture consisting of gasoline 130/150° (Esso Solvent) and xylene 1:1 are stirred into a paste and diluted and processed as described above.

Example 13

6 parts by weight of polystyrene having a $k$-value of about 50

6 parts by weight of an organic solvent-mixture consisting of gasoline 130/150° (Esso Solvent) and cyclohexanone 4:1 are stirred into a paste and diluted and processed as described above.

Example 14

6 parts by weight of a phenol-modified cyclohexanone resin 6 parts by weight of an organic solvent-mixture consisting of trichloroethylene and butanol 9:1 are stirred into a paste and diluted and processed as described above.

In the working of the furnace, special emphasis must be laid on the adjustment of the exhaust devices for the solvent vapours liberated. In the curve sections $a_1$ and $b_2$ for instance the suction must be choked as much as possible. Precise values cannot be given, being dependent upon the pass rate, the desired thickness of layer and the gauges of the sheets or strips.

This progressive increasing of the temperature and the adjustment of the exhaust devices warrant that a premature evaporation of the solvent is avoided and that a perfectly even, non-porous coating with a smooth, even surface is achieved.

It is possible to add inorganic pigments, organic dyes or pigment dyes or mixtures of pigments and dyes to the above specified dispersion. The dispersion may thus by the selection of adequate mixture conditions be adjusted to obtain coarse plaster- or stucco-like surface of the sheets and strips.

This stucco-like effect can not or only poorly be achieved by employment of the methods mentioned at the beginning, because a dense film is only possible according to the above specified dispersion example, to which the corresponding pigments and dyes are added.

If formulae as described above are used and coarse-size pigments are mixed-in, a stucco-like effect will be obtained after the heating of the metal sheets or strips applied with the plastics in a furnace, this effect being caused by the fact that the several particles protrude from the plastic layer.

As pigments may be used (examples only):

Quartz sands of different sizes
 Titanium white
 Zinc white
 Lithopone
 Chrome yellow
 China clay Instead of coarse-size pigments, finely divided pigments as used in the varnish industry may be used. In this case, the stucco-like effect will be obtained by not properly mixing-in or by not completely wetting the several particles of the pigments (forming of nodules).

Metal phthalo-cyanines, such as heliogene blue or green as well as various PV-dyes, such as PV-Echtrot, PV-Echtviolett, PV-Permanentcarmin, PV-Echtorange, all delivered by the Farbwerke Hoechst, and Chromphthalatrot delivered by the Ciba A. G., Basel, for instance may be used as pigment dyes. The sheets or strips with stucco-like coating prepared according to the above specified new method, may be used for the most diverse applications, i. e. steel furniture, wall panels, instrument casings, the inside lining of cars, etc.

The strips or sheets prepared according to the new coating method, including those with stucco-like coating, are cuppable, rustproof, weather-resistant, shock- and scratch-proof, chemical-resistant and also temperature-resistant up to about 80°. Sheets and strips provided with a stucco-like coating according to this invention may also be employed as an anti-noise device.

The new coating method has the advantage that not only coatings up to 400 g./qm. can be applied in one single coating, but that also double-sided coatings can be produced in one working procedure, for instance by first providing the sheet or strip with a one-sided varnish coating or drying it in an oven, and then according to the new method applying a dispersion to the reverse side of the sheet or strip and producing a polyethylene film following pass through a furnace.

Sheets or strips of the most diverse types can be coated according to the new method, e.g. black sheet steel (having a depth of roughness of 0.5 mm. and more), bonderized black sheet iron, flash- or fire tin-plated strips or sheets. The strip or sheet must be clean and largely grease-free.

I claim:

1. A method of applying to a metallic surface a coating consisting essentially of a thermoplastic high polymeric material which is solid at ambient temperature, comprising the steps of forming at substantially ambient temperature a dispersion of particles of said high polymeric thermoplastic material having a size of up to 100μ in a solvent having a boiling point higher than the softening point of said thermoplastic material and in which said thermoplastic material is substantially insoluble at ambient temperature; forming on said metallic surface at ambient temperature a layer of said dispersion; heating to and maintaining said layer at a first elevated temperature so as to transform said dispersion into a solution of said thermoplastic material in said solvent; and heating said layer to a second elevated temperature to evaporate said solvent, thus forming on said metallic surface a coherent and uniform coating consisting essentially of said high polymeric thermoplastic material.

2. A method of applying to a metallic surface a coating as defined in claim 1, wherein said metallic surface is at least a portion of the surface of a metal sheet and wherein a coarse-grain pigment is distributed in said dispersion prior to forming a layer thereof on said metallic surface.

3. A method of applying to a metallic surface a coating consisting essentially of a thermoplastic high polymeric material which is solid at ambient temperature, comprising the steps of forming at substantially ambient temperature a dispersion of particles of said high polymeric thermoplastic material having a size of between 20 and 100μ in a solvent mixture the major portion of which having a boiling point considerably higher than the softening point of said thermoplastic material and in which said thermoplastic material is substantially insoluble at ambient temperature; forming on said metallic surface a layer of said dispersion; heating a layer to said first elevated temperature so as to transform said dispersion into a solution of said thermoplastic material in said solvent; and heating said layer to a second elevated temperature to evaporate said solvent, thus forming on said metallic surface a coherent and uniform coating consisting essentially of said high polymeric thermoplastic material.

4. A method of applying to a metallic surface a coating consisting essentially of polyethylene as a thermoplastic high polymeric material which is solid at ambient temperature, comprising the steps of forming at substantially ambient temperature a dispersion of particles of said polyethylene having a size of up to 100μ in a solvent having a boiling point higher than the softening point of said polyethylene and in which said polyethylene is substantially insoluble at ambient temperature; forming on said metallic surface at ambient temperature a layer of said dispersion; heating to and maintaining said layer at a first elevated temperature so as to transform said dispersion into a solution of said polyethylene in said solvent; heating said layer to a second elevated temperature to evaporate said solvent, thus forming on said metallic surface a coherent and uniform coating consisting essentially of said polyethylene.

5. A method of applying to a solid surface a firmly adhering coating consisting essentially of a thermoplastic high polymeric material which is solid at an initial temperature and has a softening temperature higher than said initial temperature, comprising the steps of forming at said initial temperature a dispersion of particles of said high polymeric thermoplastic material in a solvent having a boiling temperature higher than said softening temperature of said thermoplastic material and in which said thermoplastic material is substantially insoluble at said initial temperature but soluble at a dissolution temperature higher than said softening temperature of said polymeric material but lower than said boiling temperature of said solvent; forming on said solid surface at said initial temperature a layer of said dispersion; heating said dispersion layer applied to said solid surface from said initial temperature to said dissolution temperature so as to first heat said layer of polymeric material to said softening temperature thereof causing substantially even distribution of the formed layer on said metallic surface and then further heating said preheated polymeric layer to said dissolution temperature and maintaining it at said temperature so as to transform said dispersion into a solution of said thermoplastic material in said solvent evenly covering said solid surface; and heating said thus obtained preheated even layer of solution of said thermoplastic material to said boiling temperature of said solvent thus evaporating the same and forming on said solid surface a coherent and uniform coating consisting essentially of said polymeric thermoplastic material firmly adhering to said surface.

6. A method of applying to a metallic surface a firmly adhering coating consisting essentially of a thermoplastic high polymeric material which is solid at an initial temperature and has a softening temperature higher than said initial temperature, comprising the steps of forming at said initial temperature a dispersion of particles of said high polymeric thermoplastic material in a solvent having a boiling temperature higher than said softening temperature of said thermoplastic material and in which said thermoplastic material is substantially insoluble at said initial temperature but soluble at a dissolution temperature higher than said softening temperature of said polymeric material but lower than said boiling temperature of said solvent; forming on said metallic surface at said initial temperature a layer of said dispersion; heating said dispersion layer applied to said metallic surface from said initial temperature to said dissolution temperature so as to first heat said layer of polymeric material to said softening temperature thereof causing substantially even distribution of the formed layer on said metallic surface and then further heating said preheated polymeric layer to said dissolution temperature; maintaining the thus heated layer at said dissolution temperature so as to transform said dispersion into a solution of said thermoplastic material in said solvent evenly covering said metallic surface; and heating said thus obtained preheated even layer of solution of said thermoplastic material to said boiling temperature of said solvent thus evaporating the same and forming on said metallic surface a coherent and uniform coating consisting essentially of said polymeric thermoplastic material firmly adhering to said surface.

7. A method of applying to a metallic surface a firmly adhering coating consisting essentially of a thermoplastic high polymeric material which is solid at ambient temperature and has a softening temperature higher than said ambient temperature, comprising the steps of forming at said ambient temperature a dispersion of particles of said high polymeric thermoplastic material in a solvent having a boiling temperature higher than said softening temperature of said thermoplastic material and in which said thermoplastic material is substantially insoluble at said ambient temperature but soluble at a dissolution temperature higher than said softening temperature of said polymeric material but lower than said boiling temperature of said solvent; forming on said metallic surface at said ambient temperature a layer of said dispersion; heating said dispersion layer applied to said metallic surface from said ambient temperature to said dissolution temperature so as to first heat said layer of polymeric material to said softening temperature thereof causing substantially even distribution of the formed layer on said metallic surface and then further heating said preheated polymeric layer to said dissolution temperature; maintaining the thus heated layer at said dissolution temperature so as to transform said dispersion into a solution of said thermoplastic material in said solvent evenly covering said metallic surface; and heating said thus obtained preheated even layer of solution of said thermoplastic material to said boiling temperature of said solvent thus evaporating the same and forming on said metallic surface a coherent and uniform coating consisting essentially of said polymeric thermoplastic material firmly adhering to said surface.

8. A method of applying to a metallic surface a firmly adhering coating consisting essentially of a thermoplastic high polymeric material which is solid at an initial temperature and has a softening temperature higher than said initial temperature, comprising the steps of forming at said initial temperature a dispersion of particles of said high polymeric thermoplastic material in a solvent having a boiling temperature higher than said softening temperature of said thermoplastic material and in which said thermoplastic material is substantially insoluble at said initial temperature but soluble at a dissolution temperature higher than said softening temperature of said polymeric material but lower than said boiling temperature of said solvent; forming on said metallic surface at said initial temperature a layer of said dispersion; heating said dispersion layer applied to said metallic surface from said initial temperature at substantially said softening temperature so as to soften and cause swelling of said dispersed particles and substantially even distribution of the formed layer on said metallic surface; further heating the thus preheated polymeric layer to said dissolution temperature; maintaining the thus further heated layer at said dissolution temperature so as to transform said dispersion into a solution of said thermoplastic material in said solvent evenly covering said metallic surface; and heating said thus obtained preheated even layer of solution of said thermoplastic material to said boiling temperature of said solvent thus evaporating the same and forming on said metallic surface a coherent and uniform coating consisting essentially of said polymeric thermoplastic material firmly adhering to said surface.

References Cited in the file of this patent

UNITED STATES PATENTS

| | | |
|---|---|---|
| 2,448,952 | Berry | Sept. 7, 1948 |
| 2,663,652 | Railing | Dec. 22, 1953 |
| 2,808,342 | Nickerson | Oct. 1, 1957 |
| 2,829,118 | Wehr | Apr. 1, 1958 |

FOREIGN PATENTS

| | | |
|---|---|---|
| 851,166 | Germany | Oct. 2, 1952 |
| 936,375 | Germany | Dec. 7, 1955 |